(12) United States Patent
Watanabe et al.

(10) Patent No.: US 10,249,904 B2
(45) Date of Patent: Apr. 2, 2019

(54) ELECTROCHEMICAL CELL

(71) Applicants: Seiko Instruments Inc., Chiba-shi, Chiba (JP); OHARA INC., Sagamihara-shi, Kanagawa (JP)

(72) Inventors: Shunji Watanabe, Chiba (JP); Tsuneaki Tamachi, Chiba (JP); Yoshimi Kanno, Chiba (JP); Kazumi Tanaka, Chiba (JP); Kazuhito Ogasa, Sagamihara (JP); Ryohei Sato, Sagamihara (JP)

(73) Assignees: SEIKO INSTRUMENTS INC., Chiba (JP); OHARA INC., Sagamihara (JP)

( * ) Notice: Subject to any disclaimer, the term of this patent is extended or adjusted under 35 U.S.C. 154(b) by 49 days.

(21) Appl. No.: 15/417,992

(22) Filed: Jan. 27, 2017

(65) Prior Publication Data

US 2017/0256816 A1    Sep. 7, 2017

(30) Foreign Application Priority Data

Mar. 2, 2016 (JP) ................................. 2016-040344

(51) Int. Cl.

| | |
|---|---|
| H01M 4/02 | (2006.01) |
| H01M 10/0562 | (2010.01) |
| H01M 2/30 | (2006.01) |
| H01M 4/505 | (2010.01) |
| H01M 4/525 | (2010.01) |

(Continued)

(52) U.S. Cl.
CPC ..... *H01M 10/0562* (2013.01); *H01M 2/1061* (2013.01); *H01M 2/22* (2013.01); *H01M 2/266* (2013.01); *H01M 2/30* (2013.01); *H01M 4/505* (2013.01); *H01M 4/525* (2013.01); *H01M 4/5825* (2013.01); *H01M 10/0436* (2013.01); *H01M 10/0463* (2013.01);

(Continued)

(58) Field of Classification Search
CPC ...................................................... H01M 4/02
See application file for complete search history.

(56) References Cited

U.S. PATENT DOCUMENTS

| | | | | |
|---|---|---|---|---|
| 2006/0110538 A1* | 5/2006 | Yokoi | ...................... | H01G 9/08 427/306 |
| 2013/0309551 A1 | 11/2013 | Ogasa | | |

(Continued)

FOREIGN PATENT DOCUMENTS

JP    2013-243006 A    12/2013

*Primary Examiner* — Jacob B Marks
(74) *Attorney, Agent, or Firm* — Brinks Gilson & Lione

(57) ABSTRACT

The present invention provides an electrochemical cell including: an electrode body; an exterior packaging body in which a plurality of substrates including a first substrate formed from a ceramic material are stacked in the first direction, and a cavity in which the electrode body is accommodated is formed; a first electrode connection wiring that is formed in the exterior packaging body and connects a first electrode layer and an external substrate to each other; and a second electrode connection wiring that is forming in the exterior packaging body and connects a second electrode layer and the external substrate to each other. At least the first electrode connection wiring is formed in the first substrate, and an attachment portion, to which a fastening member configured to mount at least the first electrode connection wiring to the external substrate is attached, is formed in the first substrate.

8 Claims, 12 Drawing Sheets

(51) Int. Cl.
*H01M 4/58* (2010.01)
*H01M 2/10* (2006.01)
*H01M 2/22* (2006.01)
*H01M 2/26* (2006.01)
*H01M 10/04* (2006.01)
*H01M 10/052* (2010.01)

(52) U.S. Cl.
CPC ...... *H01M 10/052* (2013.01); *H01M 2220/30* (2013.01); *H01M 2300/0068* (2013.01)

(56) References Cited

U.S. PATENT DOCUMENTS

2015/0349318 A1* 12/2015 Byun ..................... H01M 2/30
    429/179
2015/0377261 A1* 12/2015 Weh ......................... F04B 9/02
    92/33

* cited by examiner

ELECTROCHEMICAL CELL

RELATED APPLICATIONS

This application claims priority under 35 U.S.C. § 119 to Japanese Patent Application No. 2016-040344 filed on Mar. 2, 2016, the entire content of which is hereby incorporated by reference.

BACKGROUND OF THE INVENTION

Field of the Invention

The present invention relates to an electrochemical cell.

Description of Related Art

With regard to an electrochemical cell (a secondary battery, a capacitor, and the like) which are used as a power supply of various kinds of devices, a configuration, which is provided with an electrode body and an exterior packaging body in which the electrode body is accommodated, is known.

As the electrode body, a so-called all-solid-state electrode body is known. For example, as disclosed in Japanese Unexamined Patent Application, First Publication No. 2013-243006, in the all-solid-state electrode body, a positive electrode layer and a negative electrode layer are alternately stacked via a solid electrolyte.

In the all-solid-state electrode body, there is no concern of leakage or depletion of the electrolyte, and the like differently from an electrode body that uses a liquid electrolyte or a polymer electrolyte, and thus the all-solid-state electrode body has an advantage such that a long operational lifespan can be realized.

Recently, with regard to the exterior packaging body in which the all-solid-state electrode body is accommodated, a configuration (a so-called ceramic package) in which a ceramic material is used at least at a part has been examined. In this kind of exterior packaging body, a plurality of substrates including a base substrate formed from the ceramic material are stacked to form a cavity in which the electrode body is accommodated.

The secondary battery is mounted on an external substrate, for example, through soldering, and the like.

However, when the secondary battery in a charged state (a state having a battery voltage) is mounted on the external substrate, the electrode body is exposed to a high temperature during reflow, and thus there is a concern of the electrode body deteriorating.

When the secondary battery in a non-charged state (a state in which a battery voltage is not present) is mounted in the external substrate, it is necessary to perform separate charging during confirmation of an operation, or it is necessary to supply electricity from an outer side. According to this, the necessity leads to an increase in manufacturing man-hours or manufacturing facility.

In a case where the secondary battery is mounted on an external substrate of a small device (timepiece and the like), it is difficult to secure a mounting space for the secondary battery.

Consideration may be made for a configuration, in which an electrode terminal to which the secondary battery is connected is arranged in the secondary battery, instead of the configuration in which the secondary battery is mounted through soldering. However, this case leads to an increase in the number of parts, or an increase in manufacturing cost in accordance with the increase.

An aspect of the invention has been made in consideration of the above-described circumstances, and an object thereof is to provide an electrochemical cell capable of being simply mounted on an external substrate at a low cost while suppressing deterioration of an electrode body.

SUMMARY OF THE INVENTION

To solve to the problem, the invention employs the following aspects.

(1) That is, according to an aspect of the invention, there is provided an electrochemical cell including: an electrode body in which a first electrode layer and a second electrode layer are alternately stacked in a first direction through a solid electrolyte; an exterior packaging body in which a plurality of substrates including a first substrate formed from a ceramic material are stacked in the first direction, and a cavity in which the electrode body is accommodated is formed; a first electrode connection wiring that is formed in the exterior packaging body and connects the first electrode layer and an external substrate to each other; and a second electrode connection wiring that is formed in the exterior packaging body and connects the second electrode layer and the external substrate to each other. At least the first electrode connection wiring is formed in the first substrate, and an attachment portion, to which a fastening member configured to mount at least the first electrode connection wiring to the external substrate is attached, is formed in the first substrate.

According to the aspect, it is possible to suppress exposure of the electrochemical cell to a high temperature during mounting the electrochemical cell to the external substrate. According to this, even when an electrochemical cell in a charged state is mounted on the external substrate, it is possible to suppress deterioration of the electrode body. As a result, the electrochemical cell in a charged state can be mounted on the external substrate, and thus it is possible to further suppress an increase in manufacturing man-hours or manufacturing facility in comparison to a case where an electrochemical cell in a non-charged state is mounted on the external substrate. As a result, it is possible to simply realize mounting on the external substrate at the low cost.

The electrochemical cell is fixed to the external substrate with only the fastening member, and thus it is possible to further reduce a mounting space for the electrochemical cell on the external substrate in comparison to a case where the electrochemical cell is mounted on the external substrate through reflow soldering.

(2) In the aspect according to (1), the first electrode connection wiring and the second electrode connection wiring may be respectively formed in the first substrate, and the attachment portion may include a first electrode attachment portion to which a fastening member configured to mount the first electrode connection wiring to the external substrate is attached, and a second electrode attachment portion to which a fastening member configured to mount the second electrode connection wiring to the external substrate is attached.

In this case, since the attachment portion is provided with respect to each of a first electrode and a second electrode, the above-described operational effect is further exhibited.

Particularly, since the attachment portions for both of the first electrode and the second electrode are provided in the electrochemical cell, it is possible to realize a reduction in the number of parts including an external substrate side, or a cost reduction, for example, in comparison to a configuration in which an electrode terminal provided in an external substrate is used for connection of the second electrode connection wiring.

(3) In the aspect according to (1) or (2), the first substrate may include a mounting portion on which the electrode body is mounted, and the attachment portion may protrude from the mounting portion in a direction that intersects the first direction in a plan view seen from the first direction.

In this case, since the attachment portion is formed to protrude from a part of the mounting portion, it is possible to further suppress an increase in size of an external shape of the exterior packaging body in a plan view in comparison to a case where the size of the entirety of the first substrate is enlarged so as to secure the attachment portion. As a result, it is possible to realize a reduction in the mounting area on the external substrate.

(4) In the aspect according to any one of (1) to (3), a notched portion, into which the fastening member is capable of being inserted in the first direction, may be formed in the attachment portion.

In this case, since the notched portion, into which the fastening member can be inserted in the first direction, is formed in the attachment portion, it is possible to suppress a positional deviation between the electrochemical cell and the fastening member.

(5) In the aspect according to (4), at least the first electrode connection wiring may be exposed to an inner surface of the notched portion.

In this case, a portion, which is exposed to the inner surface of the notched portion, of the connection wiring, and the fastening member come into contact with each other, and thus it is possible to secure conductivity between the fastening member and the first electrode connection wiring.

(6) In the aspect according to (5), the notched portion may include a head accommodating portion in which a head of the fastening member is accommodated, and a shaft accommodating portion into which a shaft portion of the fastening member is inserted, and which has a diameter smaller than a diameter of the head accommodating portion. The first electrode connection wiring may be exposed to a surface, which faces the fastening member in the first direction, of the head accommodating portion.

In this case, since the first electrode connection wiring is exposed to a surface, which faces the fastening member in the first direction, of the head accommodating portion, it is possible to further secure the conductivity between the fastening member and the first electrode connection wiring.

(7) In the aspect according to any one of (1) to (6), the first electrode connection wiring may be exposed to a surface, which faces the external substrate, of the first substrate.

In this case, since the first electrode connection wiring is exposed to a surface, which faces the external substrate, of the first substrate, it is possible to realize conduction between the connection wiring and the external wiring formed on the external substrate only by fixing the electrochemical cell onto the external substrate.

(8) In the aspect according to (1), the second electrode connection wiring may be capable of being connected to an elastically deformable electrode terminal that is provided in the external substrate.

In this case, it is possible to further suppress an increase in size of an external shape of the exterior packaging body in a plan view in comparison to a configuration in which the attachment portion of both of the first electrode and the second electrode is provided in the electrochemical cell.

According to the aspects of (1) to (8) of the invention, it is possible to simply mount an electrode body on an external substrate at a low cost while suppressing deterioration of the electrode body.

DETAILED DESCRIPTION OF THE INVENTION

Hereinafter, respective embodiments of the invention will be described with reference to the accompanying drawings. In the following description, as an electrochemical cell according to an aspect of the invention, a description will be provided of a secondary battery including an all-solid-state electrode body. In the following drawings, the scales of respective members are appropriately changed so as to make the respective members have a recognizable size.

First Embodiment

Secondary Battery

Figure 1:
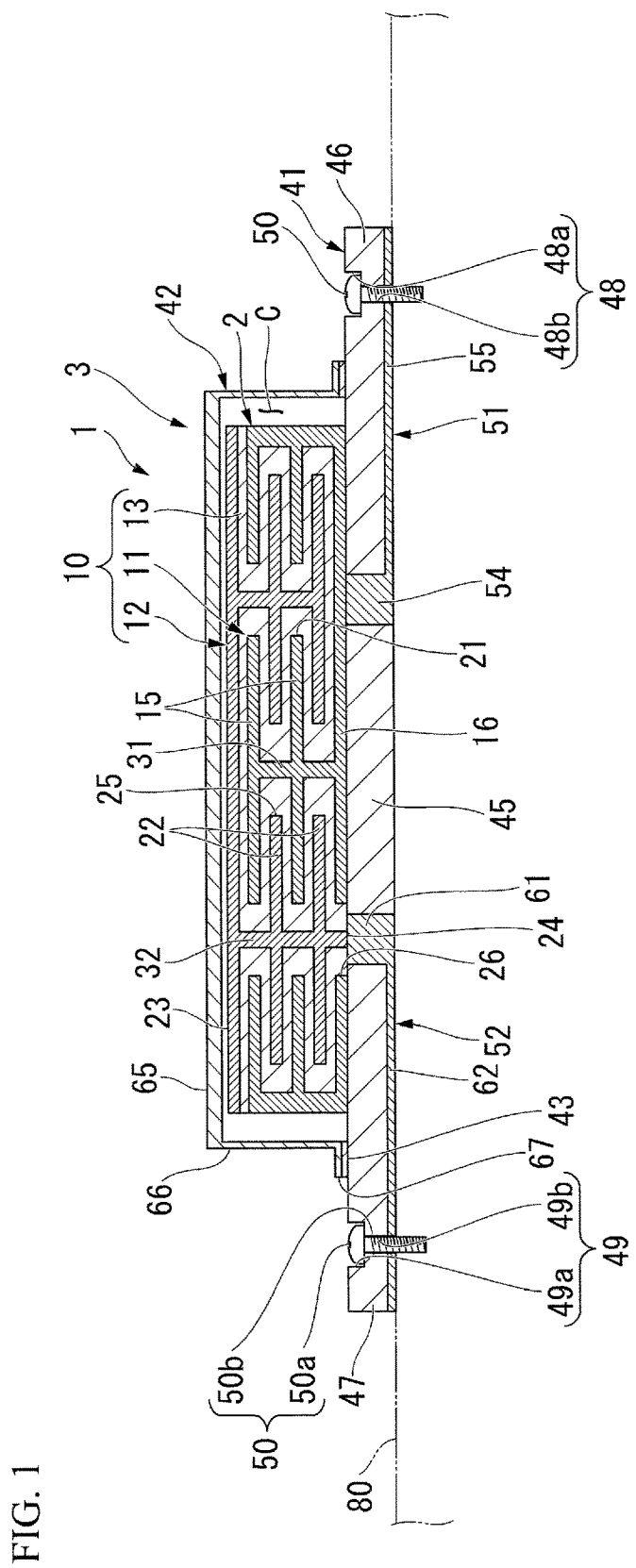
FIG. 1 is a view showing a secondary battery according to a first embodiment of the invention as a cross-sectional view taken along line I-I in FIG. 2.
Figure 2:
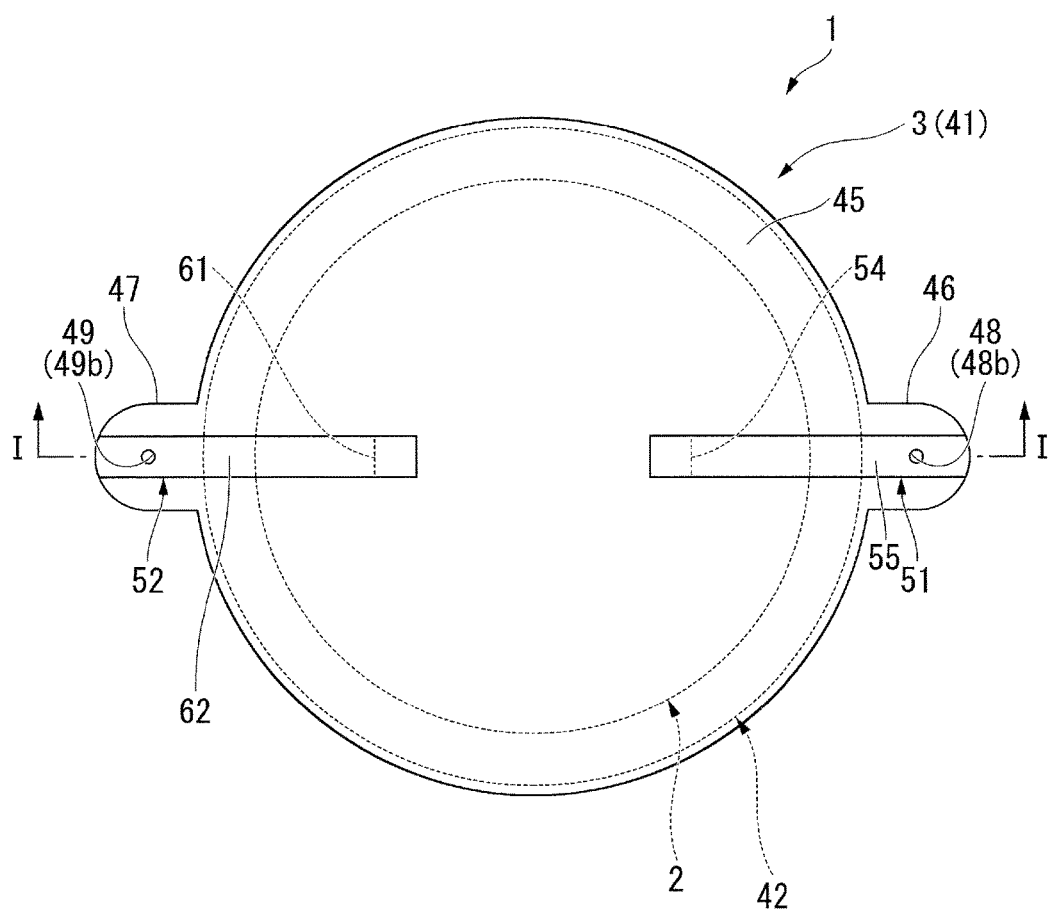
FIG. 2 is a bottom view of the secondary battery.

FIG. 1 is a cross-sectional view of a secondary battery 1 taken along line I-I in FIG. 2.

As shown in FIG. 1, the secondary battery 1 of this embodiment includes an electrode body 2, and an exterior packaging body 3 having a cavity C in which the electrode body 2 is accommodated.

Electrode Body

The electrode body 2 is a so-called all-solid-state electrode body 2. The electrode body 2 includes a stacked body 10 in which a positive electrode layer 11 and a negative electrode layer 12 are alternately stacked via a solid electrolyte layer 13.

The positive electrode layer 11 includes a positive electrode connection layer 15 and a positive electrode current collector layer 16.

The positive electrode connection layer 15 is disposed between a plurality of the solid electrolyte layers 13. The positive electrode current collector layer 16 is exposed at a first end (the lowest layer) in a stacking direction (first direction) in the electrode body 2.

A positive electrode escape hole 21, which passes through the positive electrode connection layer 15 in the stacking direction, is formed in the positive electrode connection layer 15. A plurality of the positive electrode escape holes 21 are formed with an interval in an in-plane direction that is perpendicular to the stacking direction. In a plurality of the positive electrode connection layers 15, the positive electrode escape holes 21 which correspond to each other overlap each other in a plan view seen in the stacking direction.

The positive electrode layer 11 contains a positive electrode active material, a solid electrolyte, a conductive auxiliary agent, and the like.

It is preferable that the positive electrode active material is, for example, a NASICON-type $LiV_2(PO_4)_3$, an olivine-type $Li_xJ_yMtPO_4$ (provided that, J represents at least one or more kinds selected from Al, Mg, and W, Mt represents one or more kinds selected from Ni, Co, Fe, and Mn, $0.9 \leq x \leq 1.5$, $0 \leq y \leq 0.2$), a layer-shaped oxide, or a spinel-type oxide. Particularly, it is more preferable that the electrode active material is composed of $LiMtO_2$ and/or $LiMt_2O_4$ (provided that, Mt represents one or more kinds selected from Fe, Ni, Co, and Mn) among the above-described materials. According to this, the positive electrode active material is likely to intercalate lithium ions, and thus it is possible to further increase discharge capacity of the all-solid-state secondary battery 1. As a specific example of the positive electrode active material, for example, $LiCoPO_4$, $LiCoO_2$, and $LiMn_2O_4$ can be used.

As the solid electrolyte, lithium-ion conductive glass or crystal is appropriately used. Examples of the lithium-ion conductive crystal include crystals of oxides selected from a NASICON type, a $\beta$-$Fe_2(SO_4)_3$ type, and a perovskite type. More specific examples thereof include $Li_6BaLa_2Ta_2O_{12}$, LiN, $La_{0.55}Li_{0.35}TiO_3$, $Li_{1+X}Al_x(Ti, Ge)_{2-x}(PO_4)_3$, $LiTi_2P_3O_{12}$, $Li_{1.5}Al_{0.5}Ge_{1.5}(PO_4)_3$, $Li_{1+x+y}Zr_{2-x}(Al, Y)_xSi_yP_{3-y}O_{12}$ (provided that, $0.05 \leq x \leq 0.3$, $0.05 \leq y \leq 0.3$), and the like. Among these, particularly, $Li_{1+x+z}E_yG_{2-y}Si_zP_{3y}O_{12}$ (provided that, j, x, y, and z satisfy relationships of $0 \leq x \leq 0.8$, $0 \leq z \leq 0.6$, $0 \leq y \leq 0.6$, and $0 \leq j \leq 0.6$, E is one or more kinds selected from Al, Ga, Y, Sc, Ge, Mg, Ca, Ce, Sm, and G is one or more kinds selected from Ti and Zr) is preferable.

Examples of the lithium-ion conductive glass include amorphous or polycrystalline glass of a $LiPO_3$ base, a $70LiPO_3$-$30Li_3PO_4$ base, a $Li_2O$—$SiO_2$ base, and a $Li_2O$—$SiO_2$—$P_2O_5$—$B_2O_5$—BaO base. Among these, particularly, one or more kinds selected from $Li_2O$—$P_2O_5$-based glass and $Li_2O$—$P_2O_5$-$M'_2O_3$-based glass (also including glass in which P is substituted with Si, and M' represents Al or B).

As the conductive auxiliary agent, carbon, a metal composed of at least one kind of Ni, Fe, Mn, Co, Mo, Cr, Ag, and Cu, and an alloy thereof can be used. A metal such as titanium, stainless steel, and aluminum, and a noble metal such as platinum, silver, gold, and rhodium may be used. When using the material having high electron conductivity as the conductive auxiliary agent, the amount of currents capable of being conducted through a narrow electron conduction path, which is formed in the positive electrode layer 11, increases, and thus it is possible to form the secondary battery 1 with small internal resistance without using a current collector.

The negative electrode layer 12 includes a negative electrode connection layer 22, a negative electrode exposure layer 23, and a negative electrode current collector layer 24.

The negative electrode connection layer 22 is stacked on both sides of the positive electrode connection layer 15 in the stacking direction via the solid electrolyte layer 13. A negative electrode escape hole 25, which passes through the negative electrode connection layer 22 in the stacking direction, is formed in the negative electrode connection layer 22.

A plurality of the negative electrode escape holes 25 are formed with an interval in the above-described in-plane direction. In a plurality of the negative electrode connection layers 22, the negative electrode escape holes 25 which correspond to each other overlap each other in a plan view seen in the stacking direction.

The negative electrode exposure layer 23 is exposed at a second end (uppermost layer) of the electrode body 2 in the stacking direction. The negative electrode current collector layer 24 is exposed at the lowest layer of the electrode body 2.

In this embodiment, each of the positive electrode escape holes 21 of the positive electrode connection layer 15, and each of the negative electrode escape holes 25 of the negative electrode connection layer 22 are set to have approximately the same inner diameter as each other. The positive electrode escape hole 21 of the positive electrode connection layer 15 and the negative electrode escape hole 25 of the negative electrode connection layer 22 are disposed at positions which do not overlap each other in a plan view seen in the stacking direction. In the following description, a first end side and a second end side of the electrode body 2 in the stacking direction may be referred to as a downward side and an upward side, respectively.

The negative electrode layer 12 contains a negative electrode active material, the solid electrolyte, the conductive auxiliary agent, and the like.

It is preferable that the negative electrode active material is at least one kind selected from an oxide including crystals of a NASICON-type, an olivine type, and a spinel type, a rutile-type oxide, an anatase-type oxide, an amorphous metal oxide, a metal alloy, and the like. Particularly, it is more preferable that the negative electrode active material is composed of $Li_{1+x+z}Al_yTi_2Si_zP_{3-z}O_{12}$ (provided that, x, y, and z satisfy relationships of $0 \leq x \leq 0.8$, $0 \leq z \leq 0.6$, and $0 \leq y \leq 0.6$), $Li_4Ti_5O_{12}$, and $TiO_2$ among the above-described materials. According to this, the negative electrode active material is likely to intercalate lithium ions, and thus it is possible to further increase discharge capacity of the secondary battery 1. As a specific example of the negative electrode active material, for example, $Li_2V_2(PO_4)_3$, $Li_2Fe_2(PO_4)_3$, $LiFePO_4$, $Li_4Ti_5O_{12}$, $SiO_x(0.25 \leq x \leq 2)$, and $Cu_6Sn_5$ can be used.

The solid electrolyte layer 13 is interposed between the positive electrode layer 11 and the negative electrode layer 12 to isolate the positive electrode layer 11 and the negative electrode layer 12 from each other. Furthermore, the solid electrolyte layer 13 of this embodiment is also formed in the escape holes 21 and 25 of the connection layers 15 and 22.

Here, an exposure hole 26, which passes through the positive electrode current collector layer 16 in the stacking direction, is formed in the positive electrode current collector layer 16. The exposure hole 26 overlaps any one of the above-described positive electrode escape holes 21 in a plan view seen in the stacking direction.

The negative electrode current collector layer 24 is disposed in the exposure hole 26. An external shape of the negative electrode current collector layer 24 in a plan view is smaller than that of the exposure hole 26. The negative electrode current collector layer 24 is isolated from the positive electrode current collector layer 16 via the solid electrolyte layer 13 in the exposure hole 26. Accordingly, the current collector layers 16 and 24 of this embodiment are exposed on a lower surface of the electrode body 2.

The electrode body 2 includes a positive electrode via 31 that connects a plurality of the positive electrode layers 11 (the positive electrode connection layer 15 and the positive electrode current collector layer 16) in parallel with each other, and a negative electrode via 32 that connects a plurality of the negative electrode layers 12 (the negative electrode connection layers 22, the negative electrode exposure layers 23, and the negative electrode current collector layers 24) in parallel with each other.

The positive electrode via 31 extends along the stacking direction of the electrode body 2. The positive electrode via 31 connects the positive electrode connection layers 15 and the positive electrode current collector layer 16 to each other through the negative electrode escape hole 25. An outer diameter of the positive electrode via 31 is set to be smaller than the inner diameter of the negative electrode escape hole 25. Accordingly, the positive electrode via 31 is isolated from the negative electrode connection layer 22 via the solid electrolyte layer 13 in the negative electrode escape hole 25.

The negative electrode via 32 extends along the stacking direction of the electrode body 2. The negative electrode via 32 connects the negative electrode connection layers 22, the negative electrode exposure layer 23, and the negative electrode current collector layer 24 to each other through the positive electrode escape hole 21. An outer diameter of the negative electrode via 32 is set to be smaller than the inner diameter of the positive electrode escape hole 21. Accordingly, the negative electrode via 32 is isolated from the positive electrode connection layer 15 via the solid electrolyte layer 13 in the positive electrode escape hole 21. The positive electrode escape hole 21 may be opened in an in-plane direction in addition to the stacking direction as long as the negative electrode via 32 can pass therethrough. The negative electrode escape hole 25 may be opened in an in-plane direction in addition to the stacking direction as long as the positive electrode via 31 can pass therethrough. In this embodiment, description has been given of a configuration in which the vias 31 and 32 are exposed on an outer peripheral surface of the electrode body 2, but a configuration in which the vias 31 and 32 are not opened on the outer peripheral surface of the electrode body 2 is also possible. According to this, it is possible to suppress short-circuiting of the positive electrode layer 11 and the negative electrode layer 12, and the like.

Exterior Packaging Body

The exterior packaging body 3 includes a base substrate (first substrate) 41 and a lid substrate 42. In the exterior packaging body 3 of this embodiment, a shape in a plane view seen from the stacking direction is set to a circular shape.

For example, the base substrate 41 is formed from a ceramic material (alumina and the like). The base substrate 41 is formed in a plate shape in which the stacking direction is set to a thickness direction. The base substrate 41 includes a mounting portion 45 on which the electrode body 2 is mounted, and a pair of attachment portions (a positive electrode attachment portion 46 and a negative electrode attachment portion 47) which protrude from the mounting portion 45.

FIG. 2 is a bottom view of the secondary battery 1.

As shown in FIG. 1 and FIG. 2, in the mounting portion 45, an external shape in a plan view seen from the stacking direction is set to a circular shape greater than that of the electrode body 2. A joining film 43 is formed at an outer peripheral portion on a top surface of the mounting portion 45. The joining film 43 is formed in an annular shape in a plan view, and surrounds the periphery of the electrode body 2.

The attachment portions 46 and 47 respectively protrude from positions opposite to each other in one direction (direction that intersects the stacking direction) of an in-plane direction in an outer peripheral surface of the mounting portion 45 toward both sides of the one direction. Extension directions of the attachment portions 46 and 47 may intersect each other as long as the attachment portions 46 and 47 respectively protrude from a part of the mounting portion 45.

Connection wirings (a positive electrode connection wiring 51 and a negative electrode connection wiring 52), which connect the electrode body 2 and an external substrate 80, are formed in the base substrate 41. The positive electrode connection wiring 51 includes a positive electrode through-wiring 54 that penetrates through the base substrate 41, and a positive electrode lead-out wiring 55 that is formed on a lower surface of the base substrate 41.

The positive electrode through-wiring 54 is formed at a position that shifts from the center of the mounting portion 45 toward the positive electrode attachment portion 46 in the above-described one direction in relation in a plan view. The positive electrode through-wiring 54 is exposed on upper and lower surfaces of the base substrate 41 (mounting portion 45).

The positive electrode lead-out wiring 55 extends on the lower surface of the base substrate 41 along one direction. Specifically, in the positive electrode lead-out wiring 55, a first end in the extension direction is connected to the positive electrode through-wiring 54 on the lower surface of the mounting portion 45. A second end of the positive electrode lead-out wiring 55 is located on a lower surface of the positive electrode attachment portion 46.

The negative electrode connection wiring 52 includes a negative electrode through-wiring 61 that penetrates through the base substrate 41, and a negative electrode lead-out wiring 62 that is formed on the lower surface of the base substrate 41.

The negative electrode through-wiring 61 is formed at a position that shifts from the center of the mounting portion 45 toward the negative electrode attachment portion 47 in the above-described one direction in relation in a plan view. The negative electrode through-wiring 61 is exposed on the upper and lower surfaces of the base substrate 41 (mounting portion 45).

The negative electrode lead-out wiring 62 extends on the lower surface of the base substrate 41 along one direction. Specifically, in the negative electrode lead-out wiring 62, a first end in the extension direction is connected to the negative electrode through-wiring 61 on the lower surface of the mounting portion 45. A second end of the negative electrode lead-out wiring 62 is located on a lower surface of the negative electrode attachment portion 47.

A positive electrode notched portion 48, which passes through the positive electrode attachment portion 46 in the stacking direction, is formed in the positive electrode attachment portion 46. A negative electrode notched portion 49, which passes through the negative electrode attachment portion 47 in the stacking direction, is formed in the negative electrode attachment portion 47. The notched portions 48 and 49 have a configuration in which a fastening member 50 configured to mount the secondary battery 1 on the external substrate 80 can be inserted therethrough.

As shown in FIG. 1, the notched portions 48 and 49 are configured as a stepped hole of which a diameter is gradually reduced as it goes to a downward side. Specifically, the positive electrode notched portion 48 includes a head accommodating portion 48a in which a head 50a of the fastening member 50 is accommodated, and a shaft accommodating portion 48b into which a shaft 50b of the fastening member 50 is inserted. The negative electrode notched portion 49 includes a head accommodating portion 49a in which the head 50a of the fastening member 50 is accommodated, and a shaft accommodating portion 49b into which the shaft 50b of the fastening member 50 is inserted. The shaft accommodating portions 48b and 49b are formed to have a diameter smaller than that of the head accommodating portions 48a and 49a. The positive electrode lead-out wiring 55 is exposed to an inner peripheral surface of the shaft accommodating portion 48b in the positive electrode notched portion 48. The negative electrode lead-out wiring 62 is exposed to an inner peripheral surface of the shaft accommodating portion 49b in the negative electrode notched portion 49. The inner diameter of the notched portions 48 and 49 may be uniform over the entirety of the stacking direction. The positive electrode notched portion 48 may be opened in an in-plane direction on an outer peripheral surface of the positive electrode attachment portion 46 in addition to the passing-through in the stacking direction. The negative electrode notched portion 49 may be opened in an in-plane direction on an outer peripheral surface of the negative electrode attachment portion 47 in addition to the passing-through in the stacking direction.

The electrode body 2 is mounted on the mounting portion 45 of the base substrate 41 in a state in which the current collector layers 16 and 24 face a downward side. The positive electrode current collector layer 16 of the electrode body 2 is mounted on the positive electrode through-wiring 54 on the upper surface of the mounting portion 45 through soldering and the like. The negative electrode current collector layer 24 of the electrode body 2 is mounted on the negative electrode through-wiring 61 on the upper surface of the mounting portion 45 through soldering and the like. That is, in the electrode body 2 of this embodiment, the current collector layers 16 and 24 are respectively mounted on the through-wirings 54 and 61 which correspond to the current collector layers 16 and 24 on the same surface (lower surface of the electrode body 2). The current collector layers 16 and 24, and the through-wirings 54 and 61 may be mounted, for example, with a thermosetting conductive adhesive.

The lid substrate 42 is formed from a material (for example, a metallic material such as kovar) of which a coefficient of thermal expansion is close to a coefficient of thermal expansion of the base substrate 41. In the lid substrate 42, a shape in a cross-sectional view along the stacking direction is a hat type. Specifically, the lid substrate 42 includes a ceiling wall portion 65, a surrounding wall 66 that extends from an outer peripheral edge of the ceiling wall portion 65 to a downward side, and a flange portion 67 that protrudes from a lower end edge of the surrounding wall 66 toward an outer side.

The ceiling wall portion 65 is formed in a circular shape in which an external shape thereof in a plan view seen from the stacking direction is greater than that of the electrode body 2. The ceiling wall portion 65 faces the mounting portion 45 of the base substrate 41 in the stacking direction with the electrode body 2 interposed therebetween.

The surrounding wall 66 surrounds the periphery of the electrode body 2. A space, which is surrounded by the mounting portion 45 of the base substrate 41, and the ceiling wall portion 65 and the surrounding wall 66 of the lid substrate 42, constitutes the cavity C in which the electrode body 2 is accommodated.

The flange portion 67 is formed in a circular shape in which an outer diameter is equal to or less than an outer diameter of the mounting portion 45. A lower surface of the flange portion 67 is joined to the upper surface of the mounting portion 45 via the joining film 43. In this embodiment, the flange portion 67 is joined onto the mounting portion 45 through baking of a brazing material such as a silver solder, a soldering material, and the like. According to this, the cavity C is air-tightly sealed.

The secondary battery 1 configured as described above is mounted on the external substrate 80 by the fastening member 50 as described above. Specifically, the secondary battery 1 is placed on the external substrate 80 in a state in which the base substrate 41 faces a downward side. In the external substrate 80, a positive electrode external wiring (not shown) is formed in a portion that overlaps the positive electrode attachment portion 46 in the stacking direction. In the external substrate 80, a negative electrode external wiring (not shown) is formed in a portion that overlaps the negative electrode attachment portion 47 in the stacking direction. The fastening member 50 is fastened to a female screw portion (not shown) in the external substrate 80 in a state in which the fastening member 50 is inserted through the notched portions 48 and 49 of the attachment portions 46 and 47.

According to this, the secondary battery 1 is fixed to the external substrate 80 in a state in which the positive electrode lead-out wiring 55 and the positive electrode external wiring are electrically connected to each other, and the negative electrode lead-out wiring 62 and the negative electrode external wiring are electrically connected to each other. Specifically, in this embodiment, the positive electrode lead-out wiring 55 and the positive electrode external wiring may be electrically connected to each other via the fastening member 50, and the negative electrode lead-out wiring 62 and the negative electrode external wiring are electrically connected to each other via the fastening member 50. In this case, the fastening member 50 is electrically connected to the external wiring at a fastening portion with the external substrate 80. On the other hand, the fastening member 50 comes into contact with portions, which are exposed to inner surfaces of the notched portions 48 and 49, in the lead-out wirings 55 and 62, and is electrically connected to the lead-out wirings 55 and 62.

The base substrate 41 is formed in a flat plate shape. Accordingly, in a case of forming the base substrate 41 by stacking a ceramic sheet (green sheet), for example, it is possible to further reduce the stacking number of the ceramic sheet in comparison to a configuration (for example, refer to FIG. 10) in which the base substrate is provided with a concave portion. According to this, it is possible to realize a cost reduction.

The fastening member 50 may not be electrically connected to various wirings as long as the lead-out wirings 55 and 62 which correspond to external wirings, and the external wirings are directly connected to each other, respectively. In this case, in this embodiment, description has been given of a configuration in which the lead-out wirings 55 and 62 are formed at positions which overlap the notched portions 48 and 49 in the stacking direction, but there is no limitation to the configuration.

Method of Manufacturing Secondary Battery

Next, a description will be provided of a method of manufacturing the above-described secondary battery 1.

The method of manufacturing the secondary battery 1 in this embodiment includes an electrode body forming process, and a sealing process of sealing the electrode body 2 with the exterior packaging body 3.

Electrode Body Forming Process

The electrode body forming process mainly includes a positive electrode sheet preparing process, a negative electrode sheet preparing process, a stacking process, and a hot pressing process.

Positive Electrode Sheet Preparing Process

In the positive electrode sheet preparing process, a raw material composition of the positive electrode layer 11 is applied onto a base material to form a positive electrode green sheet. In the positive electrode green sheet, the positive electrode escape hole 21 is formed in a positive electrode green sheet that becomes the positive electrode connection layer 15. In the positive electrode green sheet that becomes the positive electrode connection layer 15, a raw material composition of the solid electrolyte layer 13 is applied to a region except for a portion corresponding to the negative electrode escape hole 25 of the negative electrode green sheet. In the positive electrode green sheet, the exposure hole 26 is formed in a positive electrode green sheet that becomes the positive electrode current collector layer 16. In the positive electrode green sheet that becomes the positive electrode current collector layer 16, the raw material composition of the solid electrolyte layer 13 is applied to a region except for a portion corresponding to the negative electrode escape hole 25 of the negative electrode green sheet. The above-described green sheet represents a glass powder formed in a thin plate shape, and a non-baked body of a crystal (ceramic or glass ceramic) powder. Specifically, the green sheet in this embodiment represents a member obtained by mixing a raw material composition of the electrode layers (the positive electrode layer 11 and the negative electrode layer 12) or the solid electrolyte layer 13 in an organic binder, a solvent, and the like into a slurry or paste shape, and by molding the resultant slurry or paste-shaped mixture into a thin plate shape. The green sheet in this embodiment also includes a different green sheet, or a member in which the raw material composition is applied to a baked body of the different green sheet.

Negative Electrode Sheet Preparing Process

In the negative electrode sheet preparing process, a raw material composition of the negative electrode layer 12 is applied onto a base material to form a negative electrode green sheet. In the negative electrode green sheet, the negative electrode escape hole 25 is formed in a negative electrode green sheet that becomes the negative electrode connection layer 22. In the negative electrode green sheet that becomes the negative electrode connection layer 22, the raw material composition of the solid electrolyte layer 13 is applied to a region except for a portion corresponding to the positive electrode escape hole 21 of the positive electrode green sheet.

Stacking Process

In the stacking process, the positive electrode sheet that is prepared in the positive electrode sheet preparing process, and the negative electrode sheet that is prepared in the negative electrode sheet preparing process are stacked. At this time, the positive electrode sheet that becomes the positive electrode connection layer 15, and the negative electrode sheet that becomes the negative electrode connection layer 22 are alternately stacked in such a manner that the positive electrode escape holes 21 overlap each other in the stacking direction, and the negative electrode escape holes 25 overlap each other in the stacking direction. The positive electrode sheet, which becomes the positive electrode current collector layer 16, is located in the lowest layer in the stacking direction, and is stacked in such a manner that the exposure hole 26 and corresponding positive electrode escape holes 21 of the positive electrode connection layer 15 overlap each other in the stacking direction.

Degreasing Process

Next, the following degreasing process is performed. In the degreasing process, a sheet stacked body, which is prepared in the stacking process and is constituted by the positive electrode sheet and the negative electrode sheet, is heated to gasify and remove an organic binder component that is contained in the sheet stacked body. According to this, carbon, which remains in the solid electrolyte after the hot pressing process, is reduced, and thus it is possible to prevent short-circuiting (electron conduction in the solid electrolyte).

Hot Pressing Process

In the hot pressing process, the sheet stacked body is heated while being compressed in the stacking direction to bake the sheet stacked body. In this case, in the sheet stacked body, the positive electrode sheets, which are adjacent to each other with the negative electrode sheet interposed therebetween, come into contact with each other through the negative electrode escape hole 25 in the stacking direction. In the sheet stacked body, the negative electrode sheets, which are adjacent to each other with the positive electrode sheet interposed therebetween, come into contact with each other through the positive electrode escape hole 21 of the positive electrode connection layer 15 in the stacking direction. That is, in the positive electrode sheets, a portion, which connects the positive electrode sheets adjacent to each other through the inside of the negative electrode escape hole 25, becomes the positive electrode via 31. In the negative electrode sheets, a portion, which connects the negative electrode sheets adjacent to each other through the inside of the positive electrode escape hole 21, becomes the negative electrode via 32.

In the sheet stacked body, a negative electrode sheet, which is located on the most downward side, is exposed to a lower surface through the exposure hole 26 of the positive electrode current collector layer 16. That is, in the negative electrode sheets, a portion, which is exposed to the lower surface of the sheet stacked body through the exposure hole 26, becomes the negative electrode current collector layer 24.

Sealing Process

A sealing process includes an underlying film forming process, a solder applying process, a setting process, and a joining process.

Underlying Film Forming Process

Figure 3:
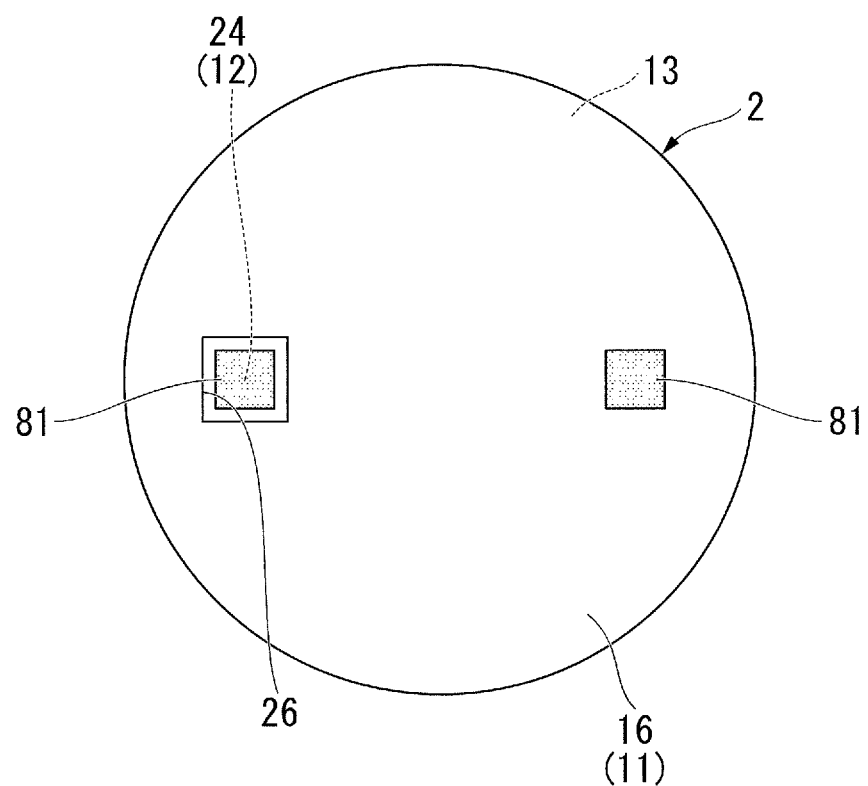
FIG. 3 is a process view showing an underlying film forming process as a bottom view of the electrode body.

FIG. 3 is a process view showing the underlying film forming process and is a bottom view of the electrode body 2.

As shown in FIG. 3, in the underlying film forming process, an underlying film 81 is formed on the lower surface of the electrode body 2 at a portion at which the current collector layers 16 and 24 are exposed. The underlying film 81 has a configuration in which a second underlying film (for example, Au and the like) is stacked on a first underlying film (for example, Cr, Ni, and the like). Furthermore, the underlying film 81 is formed by a dry process (for example, deposition, sputtering, and the like).

(Solder Applying Process)

Figure 4:
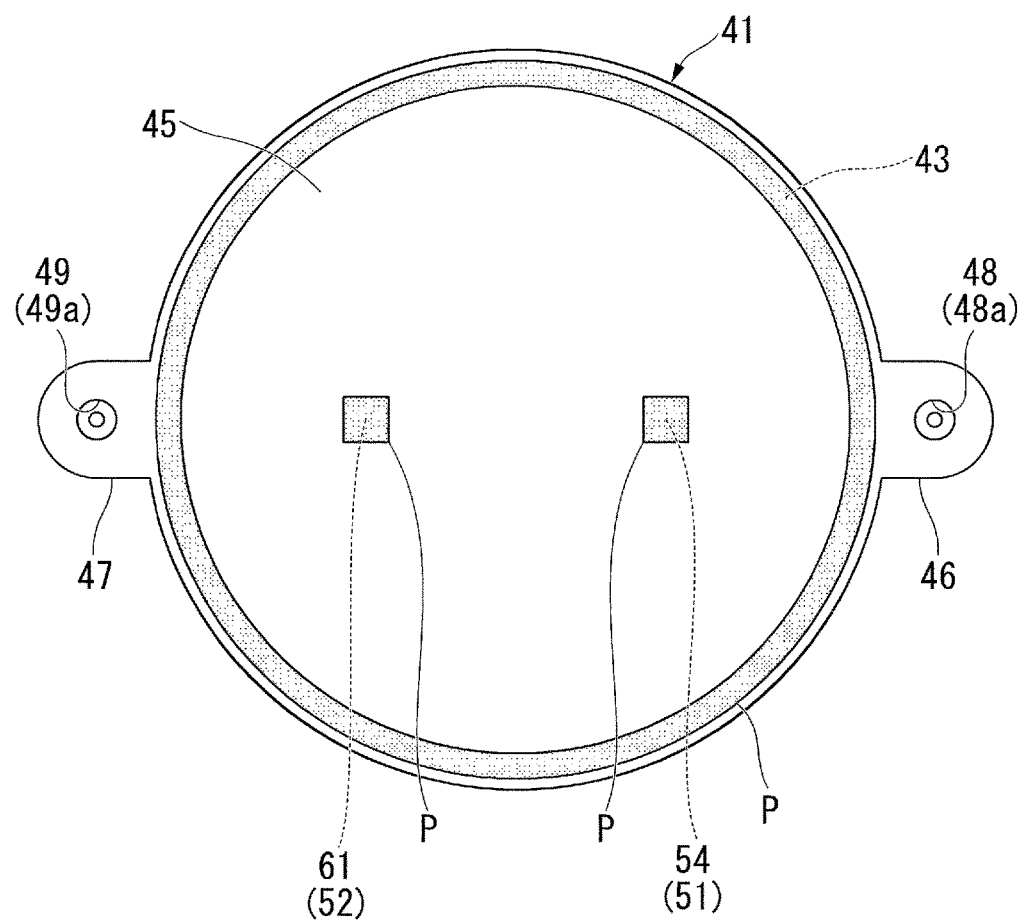
FIG. 4 is a process view showing a solder applying process as a plan view of a base substrate.

FIG. 4 is a process view showing a solder applying process, and is a plan view of the base substrate 41.

As shown in FIG. 4, in the solder applying process, solder paste P (for example, solder cream) is applied on the through-wirings 54 and 61, and the joining film 43 on the upper surface of the base substrate 41.

(Setting Process)

Figure 5:
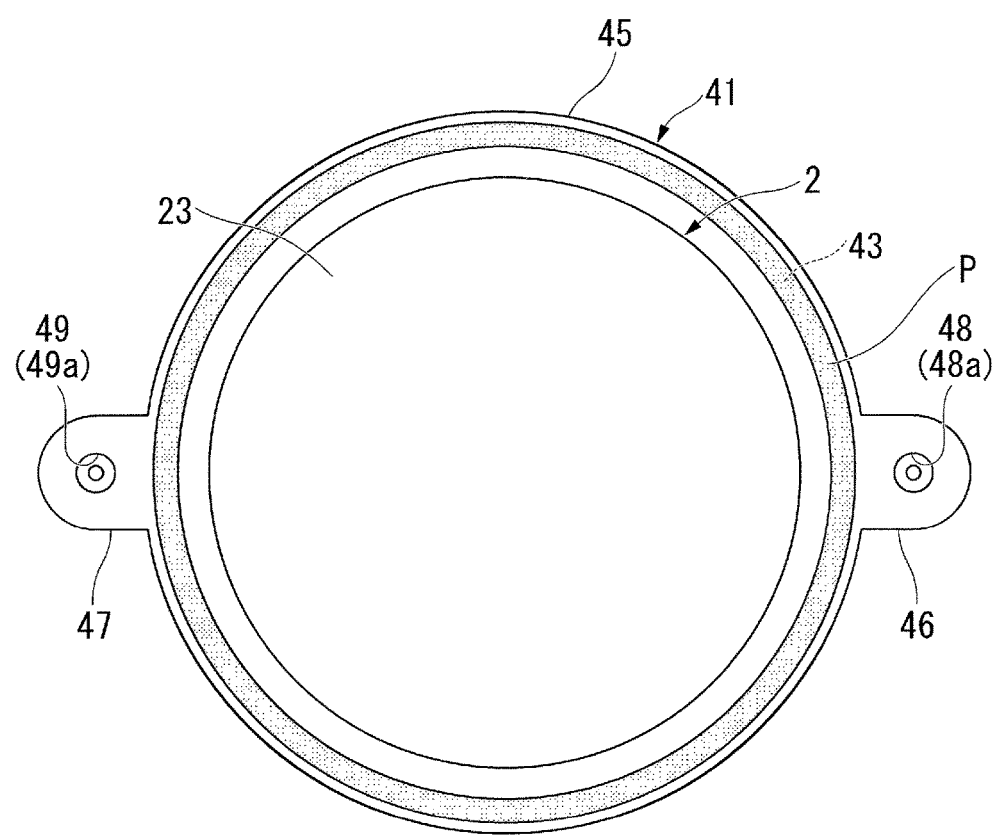
FIG. 5 is a process view showing a setting process as a plan view of the electrode body and the base substrate.

FIG. 5 is a process view showing a setting process, and is a plan view of the electrode body 2 and the base substrate 41.

As shown in FIG. 5, in the setting process, first, the electrode body 2 is set on the base substrate 41. Specifically, the upper surface of the base substrate 41 and the lower surface of the electrode body 2 are made to face each other in the stacking direction, and the electrode body 2 is disposed on the base substrate 41 so that the positive electrode current collector layer 16 is connected to the positive electrode through-wiring 54, and the negative electrode current collector layer 24 is connected to the negative electrode through-wiring 61.

Subsequently, the lid substrate 42 is set on the base substrate 41. Specifically, the lid substrate 42 is disposed on the base substrate 41 so that the lid substrate 42 covers the electrode body 2 from an upward side, and the flange portion 67 is disposed on the joining film 43.

Joining Process

In the joining process, the electrode body 2 and the base substrate 41 are joined to each other, and the base substrate 41 and the lid substrate 42 are joined to each other. In this embodiment, mounting of the electrode body 2 and sealing of the exterior packaging body 3 with respect to the base substrate 41 are simultaneously performed by performing reflow soldering. The mounting of the electrode body 2 and sealing of the exterior packaging body 3 with respect to the base substrate 41 may be performed by separate processes. The sealing of the exterior packaging body 3 may be performed by brazing and the like.

According to this, the secondary battery 1 is completed. Then, as described above, the secondary battery 1 is mounted on the external substrate 80 by using the fastening member 50.

As described above, in this embodiment, the attachment portions 46 and 47, to which the fastening member 50 configured to mount the secondary battery 1 on the external substrate 80 is attached, is provided in the base substrate 41.

According to this configuration, when mounting the secondary battery 1 on the external substrate 80, it is possible to suppress exposure of the secondary battery 1 to a high temperature. According to this, even when the secondary battery 1 in a charged state is mounted on the external substrate 80, it is possible to suppress deterioration of the electrode body 2. As a result, it is possible to mount the secondary battery 1 in a charged state on the external substrate 80, and thus it is possible to further suppress an increase in manufacturing man-hours or manufacturing facility in comparison to a case where the secondary battery 1 in a non-charged state is mounted on the external substrate 80. As a result, it is possible to simply realize mounting on the external substrate 80 at the low cost.

In this embodiment, since the secondary battery 1 is fixed to the external substrate 80 with only the fastening member 50, it is possible to further reduce a mounting space on the external substrate 80 in comparison to a case where the secondary battery 1 is mounted on the external substrate 80 through reflow soldering.

In this embodiment, since the attachment portions 46 and 47 are respectively provided with respect to the positive electrode and the negative electrode, the above-described operation effect is further exhibited.

Particularly, since the attachment portions 46 and 47 for both of the positive electrode and the negative electrode are integrally provided in the secondary battery 1 (base substrate 41), for example, it is possible to realize a reduction in the number of parts including the external substrate 80 side, or a cost reduction, for example, in comparison to a configuration in which an electrode terminal provided in the external substrate 80 is used for connection of any one of the positive electrode and the negative electrode.

In this embodiment, since the attachment portions 46 and 47 are formed to protrude from a part of the base substrate 41, it is possible to further suppress an increase in an external shape of the exterior packaging body 3 in a plan view in comparison to a case where the size of the entirety of the base substrate 41 is enlarged so as to secure the attachment portion of the fastening member 50. As a result, it is possible to realize a reduction in a mounting area on the external substrate 80.

In this embodiment, since the fastening member 50 is inserted into the notched portions 48 and 49 which penetrate the attachment portions 46 and 47 in the stacking direction, it is possible to suppress a positional deviation between the secondary battery 1 and the fastening member 50.

In this embodiment, the connection wirings 51 and 52 (lead-out wirings 55 and 62) are exposed to the lower surface of the base substrate 41. According to this, it is possible to realize conduction between the connection wirings 51 and 52 and the external wiring formed on the external substrate 80 only by fixing the secondary battery 1 onto the external substrate 80.

In this embodiment, since the mounting of the electrode body 2 and the sealing of the exterior packaging body 3 with respect to the base substrate 41 are simultaneously performed through reflow soldering, it is possible to realize an improvement in manufacturing efficiency.

Figure 6:
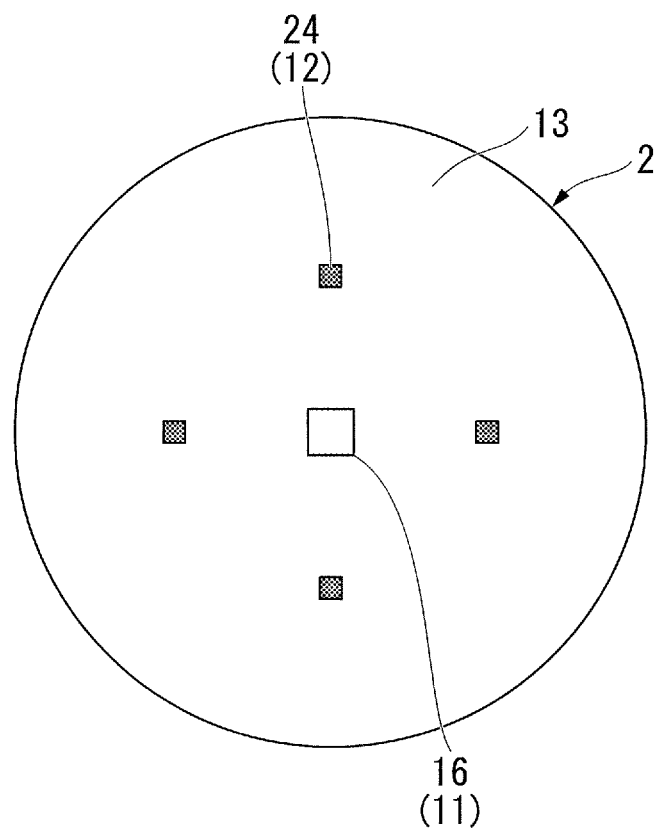
FIG. 6 is a bottom view of an electrode body according to a modification example of the first embodiment.

The layout of the current collector layers 16 and 24 can be appropriately changed. For example, in an example shown in FIG. 6, the positive electrode current collector layer 16 is disposed at the central portion in an in-plane direction on the lower surface of the electrode body 2. A plurality of the negative electrode current collector layers 24 are disposed at the periphery of the positive electrode current collector layer 16 in the electrode body 2.

Figure 7:
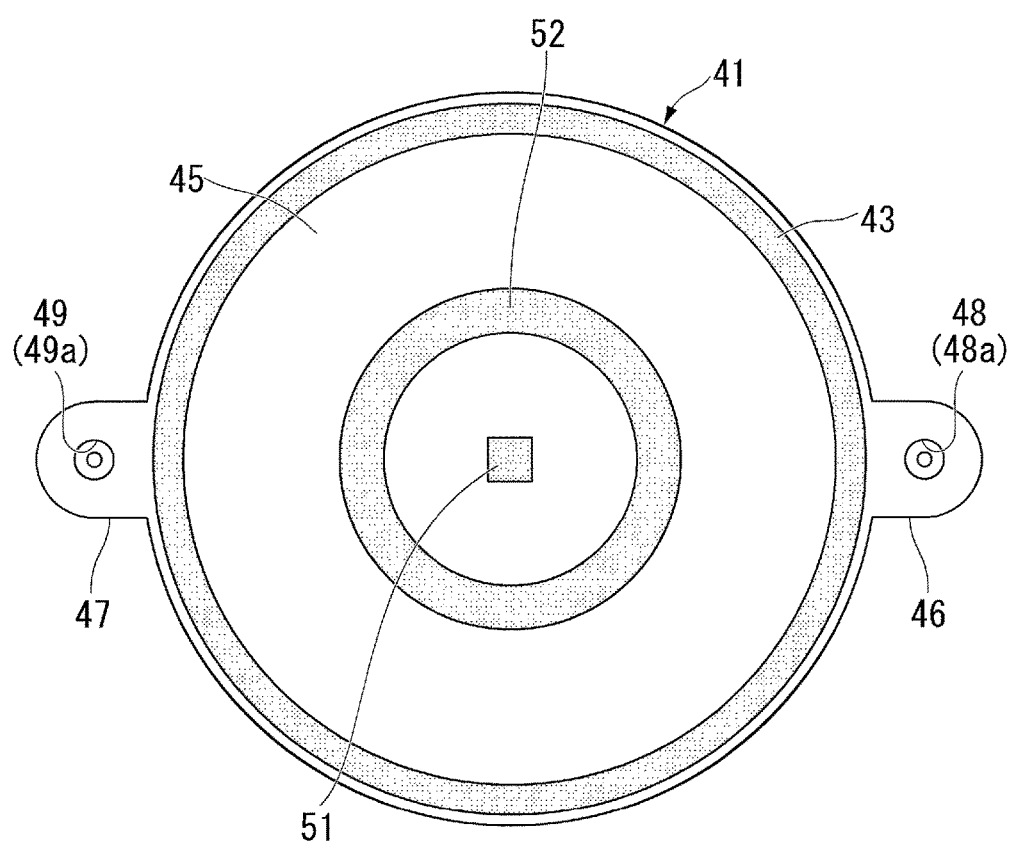
FIG. 7 is a plan view of a base substrate according to the modification example of the first embodiment.

The layout of the connection wirings 51 and 52 also can be appropriately changed in accordance with the layout of the current collector layers 16 and 24. For example, in an example shown in FIG. 7, the positive electrode connection wiring 51 is disposed on at the central portion in an in-plane direction on the upper surface of the base substrate 41. The circular negative electrode connection wiring 52, which surrounds the positive electrode connection wiring 51, is disposed at the periphery of the positive electrode connection wiring 51 in the base substrate 41.

Second Embodiment

Next, a second embodiment of the invention will be described.

Figure 8:
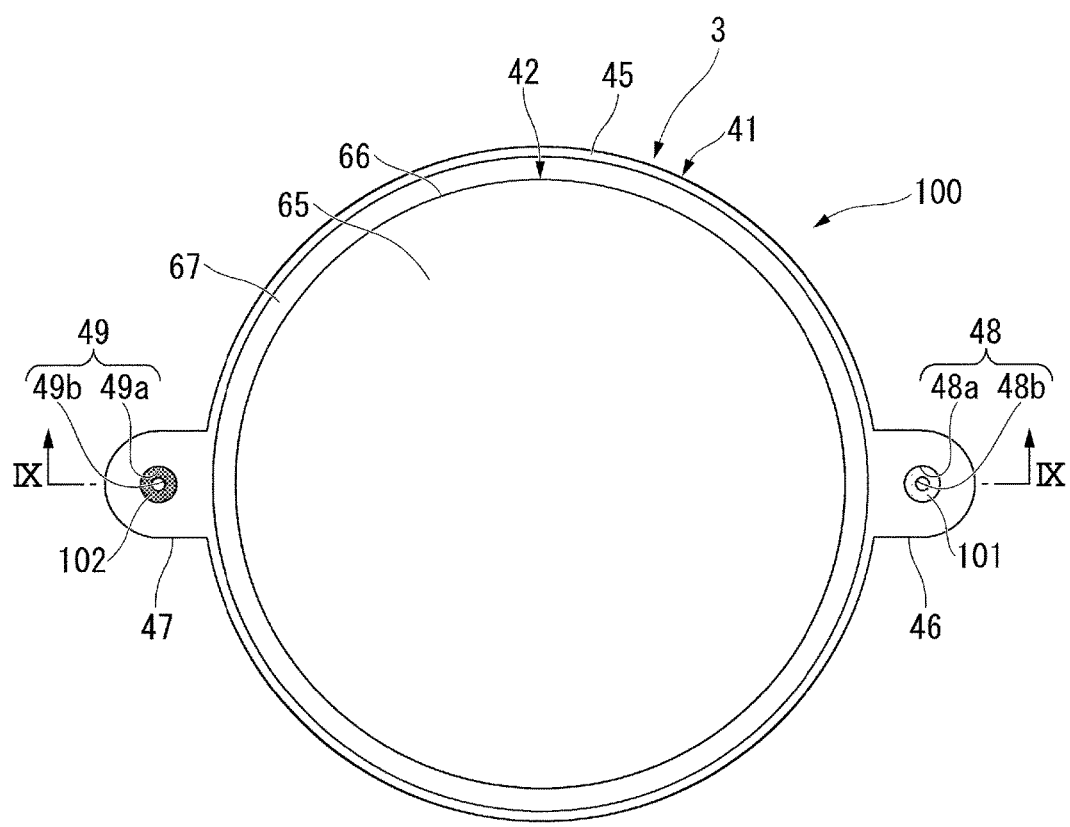
FIG. 8 is a plan view of a secondary battery according to a second embodiment of the invention.

FIG. 8 is a plan view of a secondary battery 100 according to the second embodiment.

Figure 9:
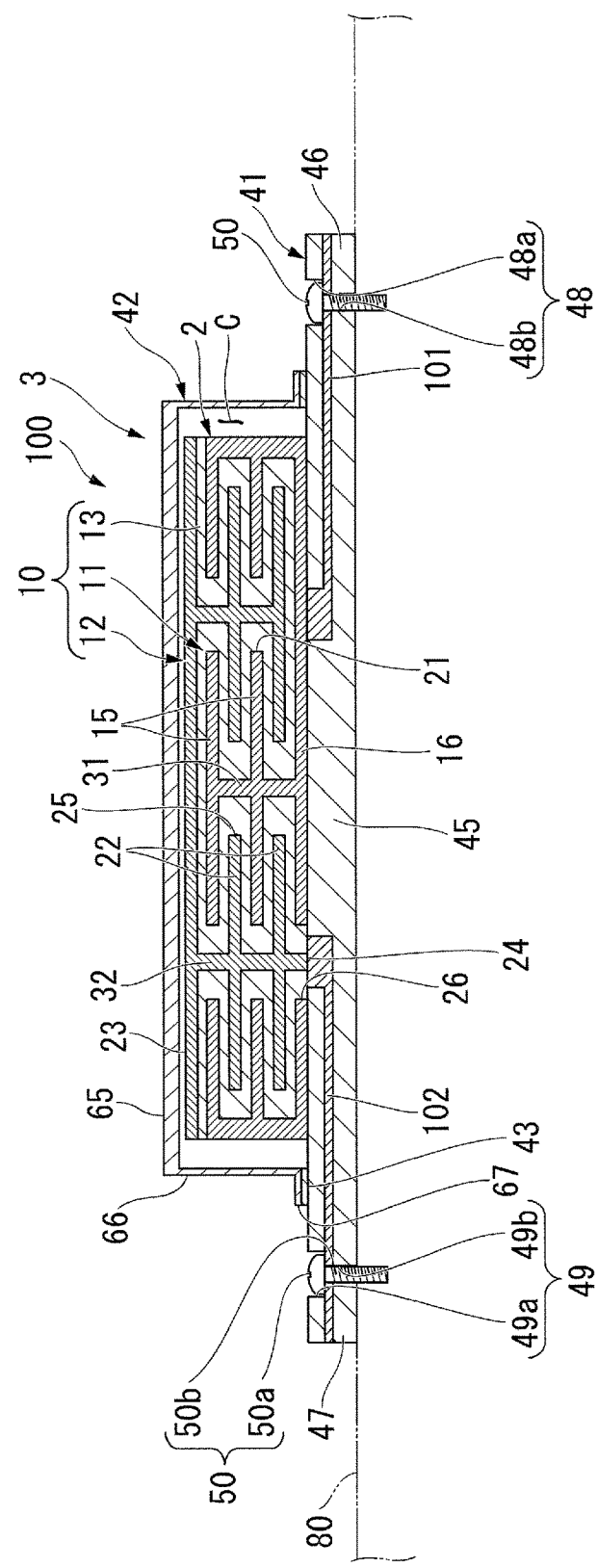
FIG. 9 is a cross-sectional view taken along line IX-IX in FIG. 8.

FIG. 9 is a cross-sectional view taken along line IX-IX in FIG. 8.

As shown in FIG. 8 and FIG. 9, this embodiment is different from the first embodiment in that connection wirings 101 and 102, which connect the electrode body 2 and the external wiring, are embedded in the base substrate 41. In the following description, the same reference numeral will be given to the same configuration as in the first embodiment.

In a secondary battery 100 shown in FIG. 9, the positive electrode connection wiring 101 extents at the inside of the base substrate 41 along the above-described one direction. A first end of the positive electrode connection wiring 101 extends at the inside of the base substrate 41 toward an upward side, and is exposed on the upper surface of the base substrate 41. The positive electrode current collector layer 16 of the electrode body 2 is mounted on the positive electrode connection wiring 101 on the upper surface of the base substrate 41. A second end of the positive electrode connection wiring 101 is terminated at the inside of the positive electrode attachment portion 46. The second end of the positive electrode connection wiring 101 is exposed over the bottom surface of the head accommodating portion 48a and the inner peripheral surface of the shaft accommodating portion 48b in the inner surface of the notched portion 48 in the positive electrode attachment portion 46. It is preferable that a plating film (for example, Au and the like) (not shown) is formed at a portion, which is exposed to the inner surface of the notched portion 48, of the positive electrode connection wiring 101.

The negative electrode connection wiring 102 extends at the inside of the base substrate 41 along one direction. A first end of the negative electrode connection wiring 102 extends at the inside of the base substrate 41 to an upward side, and is exposed on the upper surface of the base substrate 41. The negative electrode current collector layer 24 of the electrode body 2 is mounted on the negative electrode connection wiring 102 on the upper surface of the base substrate 41. A second end of the negative electrode connection wiring 102 is terminated at the inside of the negative electrode attachment portion 47. The second end of the negative electrode connection wiring 102 is exposed over the bottom surface of the head accommodating portion 49a and the inner peripheral surface of the shaft accommodating portion 49b in the inner surface of the notched portion 49 in the negative electrode attachment portion 47. It is preferable that a plating film (for example, Au and the like) (not shown) is formed at a portion, which is exposed to the inner surface of the notched portion 49, of the negative electrode connection wiring 102.

According to this embodiment, it is possible to realize conduction between each of the connection wirings 101 and 102, and the external wiring via the fastening member 50. That is, in this embodiment, the fastening member 50 is electrically connected to the external wiring at a fastening portion with the external substrate 80. The fastening member 50 comes into contact with a portion, which is exposed to the inner surface of each of the notched portions 48 and 49, of each of the connection wirings 101 and 102, and is electrically connected to each of the connection wirings 101 and 102.

Particularly, in this embodiment, the connection wirings 101 and 102 are exposed to the bottom surface of the head accommodating portions 48a and 49a, and thus it is possible to secure conductivity between the fastening member 50 and each of the connection wirings 101 and 102.

In this embodiment, the connection wirings 101 and 102 are covered with the base substrate 41, and thus it is possible to prevent short-circuiting between the connection wirings 101 and 102, and various wirings and the like, for example, on the external substrate.

Third Embodiment

Next, a third embodiment of the invention will be described.

Figure 10:
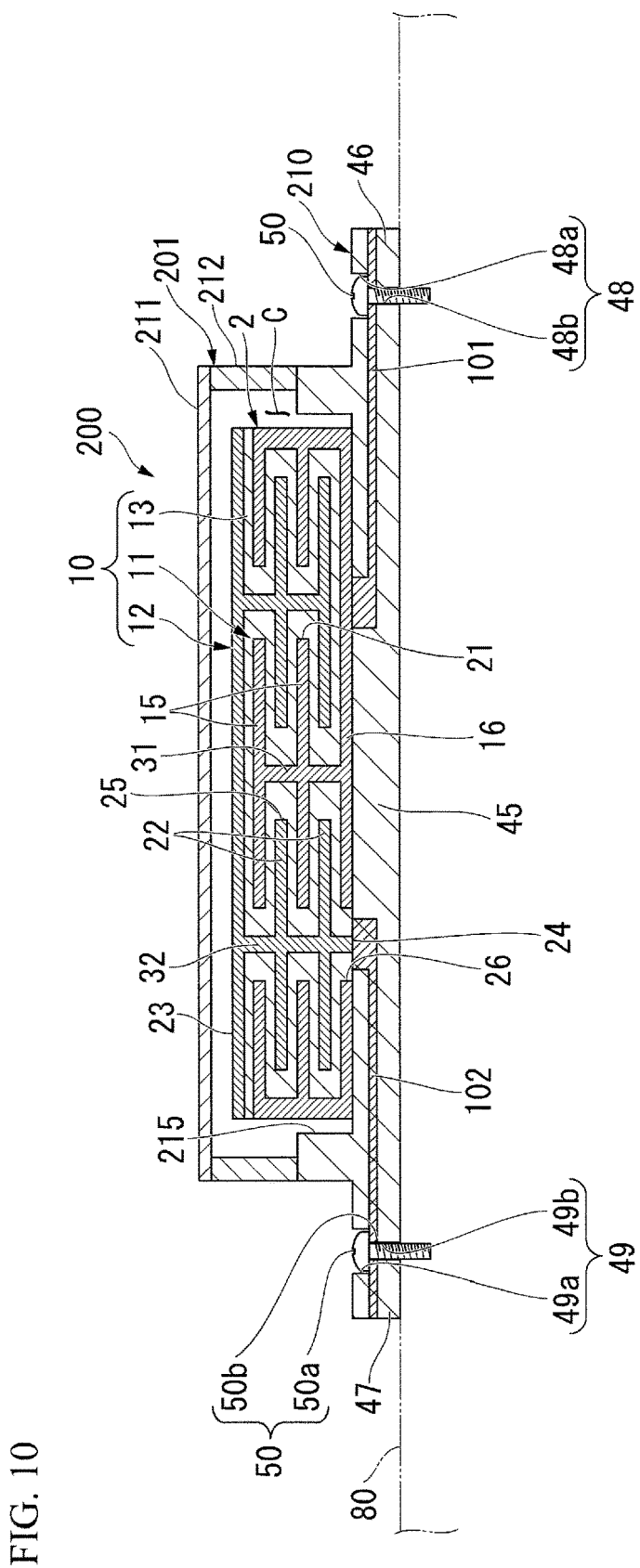
FIG. 10 is a view showing a secondary battery according to a third embodiment of the invention as a cross-sectional view corresponding to FIG. 1.

FIG. 10 is a view showing a secondary battery 200 according to the third embodiment, and is a cross-sectional view corresponding to FIG. 1.

This embodiment is different from the first embodiment in a configuration of an exterior packaging body 201. In the following description, the same reference numeral will be given to the same configuration as in the above-described embodiments.

In a secondary battery 200 shown in FIG. 10, an exterior packaging body 201 includes a base substrate 210 that is disposed on a downward side of the electrode body 2, a lid substrate 211 that is disposed on an upward side of the electrode body 2, and a seal ring 212 that is disposed between the substrates 210 and 211.

The base substrate 210 is formed in a box shape including a concave portion 215 that is opened toward an upward side. The second end of each of the connection wirings 101 and 102 is exposed on the bottom surface of the concave portion 215.

The seal ring 212 is formed in a frame shape that surrounds the periphery of the electrode body 2. A lower surface of the seal ring 212 is joined to an upper surface of the base substrate 210. Specifically, the seal ring 212 is joined onto the base substrate 210 through baking of a brazing material such as a silver solder, a soldering material, and the like.

Examples of a material of the seal ring 212 include a nickel-based alloy and the like. Specifically, the material may be selected from kovar, elinvar, invar, 42-alloy, and the like. Particularly, as the material of the seal ring 212, it is preferable to select a material of which a coefficient of thermal expansion is close to that of the base substrate 210 formed from a ceramic material. For example, in a case of using alumina having a coefficient of thermal expansion of $6.8 \times 10^{-6}/°$ C. as the base substrate 210, it is preferable to use kovar having a coefficient of thermal expansion of $5.2 \times 10^{-6}/°$ C. or 42-alloy having a coefficient of thermal expansion of $4.5 \times 10^{-6}/°$ C. to $6.5 \times 10^{-6}/°$ C. as the seal ring 212.

The lid substrate 211 is formed from a material (for example, kovar and the like) of which a coefficient of thermal expansion is close to that of the base substrate 210 or the seal ring 212. The lid substrate 211 is joined onto the seal ring 212 (for example, through resistive seam welding, laser seam welding, and the like). According to this, the lid substrate 211 air-tightly seals the concave portion 215 of the base substrate 210. A space, which is partitioned by the base substrate 210, the lid substrate 211, and the seal ring 212, constitutes an air-tightly sealed cavity C. Joining between the lid substrate 211 and the seal ring 212 may be performed soldering, brazing, laser welding, and the like without limitation to the seam welding.

Even in this embodiment, it is possible to exhibit the same operational effect as in the above-described embodiments.

Fourth Embodiment

Next, a fourth embodiment of the invention will be described.

Figure 11:
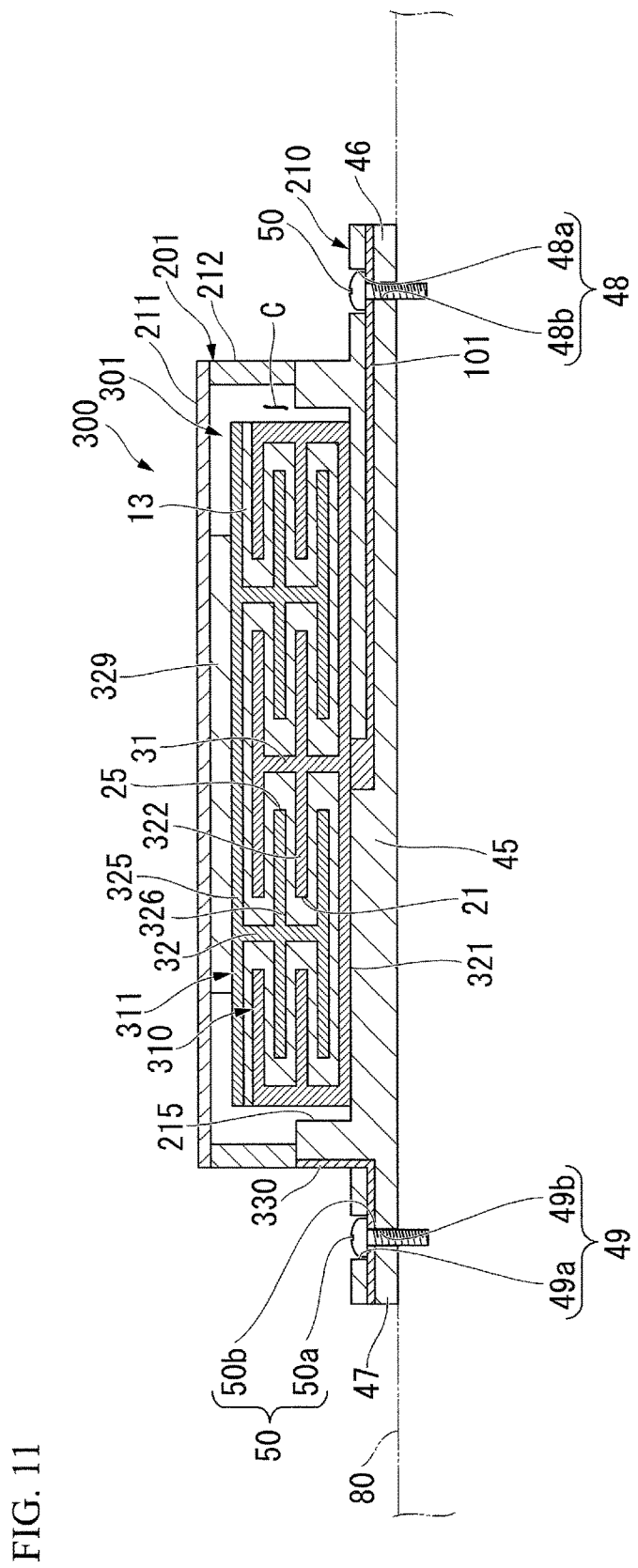
FIG. 11 is a view showing a secondary battery according to a fourth embodiment of the invention as a cross-sectional view corresponding to FIG. 1.

FIG. 11 is a view showing a secondary battery 300 according to the fourth embodiment, and is a cross-sectional view corresponding to FIG. 1.

This embodiment is different from the above-described embodiments in that current collection is performed on upper and lower surfaces of an electrode body 301. In the following description, the same reference numeral will be given to the same configuration as in the above-described embodiments.

In the secondary battery 300 shown in FIG. 11, a positive electrode layer 310 of the electrode body 301 includes a positive electrode current collector layer 321 that constitutes the lowest layer in the electrode body 301, and a positive electrode connection layer 322 that is disposed between a plurality of the solid electrolyte layers 13. The positive electrode current collector layer 321 and the positive electrode connection layer 322 are connected to each other via the positive electrode via 31.

A negative electrode layer 311 of the electrode body 301 includes a negative electrode current collector layer 325 that constitutes the uppermost layer in the electrode body 301, and a negative electrode connection layer 326 that is disposed between the solid electrolyte layers 13. The negative electrode current collector layer 325 and the negative electrode connection layer 326 are connected to each other via the negative electrode via 32.

A conductive buffer layer 329 is interposed between an upper surface of the negative electrode current collector layer 325 and a lower surface of the lid substrate 211. The conductive buffer layer 329 is joined to the negative electrode current collector layer 325 and the lid substrate 211 via a conductive adhesive (not shown). Furthermore, the conductive buffer layer 329 is constituted by, for example, graphite fiber and the like.

A negative electrode connection wiring 330 extends toward a downward side on an outer peripheral surface of the exterior packaging body 201, and extends at the inside of the base substrate 210 in the above-described one direction. A first end of the negative electrode connection wiring 330 is connected to the seal ring 212. That is, the negative electrode connection wiring 330 is connected to the negative electrode current collector layer 325 via the seal ring 212, the lid substrate 211, and the conductive buffer layer 329. A second end of the negative electrode connection wiring 330 is terminated at the inside of the negative electrode attachment portion 47.

Even in this embodiment, it is possible to exhibit the same operational effect as in the above-described embodiments.

Since the conductive buffer layer 329 is interposed between the lid substrate 211 and the electrode body 301, it is possible to absorb a volume variation of the electrode body 301 in accordance with charging and discharging, and a tolerance of the electrode body 301 and the exterior packaging body 201 with the conductive buffer layer 329. According to this, it is possible to suppress the occurrence of cracking in the electrode body 301, and it is possible to improve cycle characteristics of the electrode body 301.

Hereinbefore, the preferred embodiments of the present invention have been described, but the present invention is not limited to the embodiments. Addition, omission, substitution, and other modifications of configurations may be made within a range not departing from the gist of the present invention. The present invention is not limited by the above description, and is limited only to the range of the attached claims.

For example, in the above-described embodiments, description has been given of a secondary battery as an example of the electrochemical cell, but a capacitor or a primary battery is also possible. Materials which are used in the positive electrode layer, the negative electrode layer, and the solid electrolyte layer 13, the stacking number of the positive electrode layer or the negative electrode layer, the layout of the vias 31 and 32, and the like can be appropriately changed.

Figure 12:
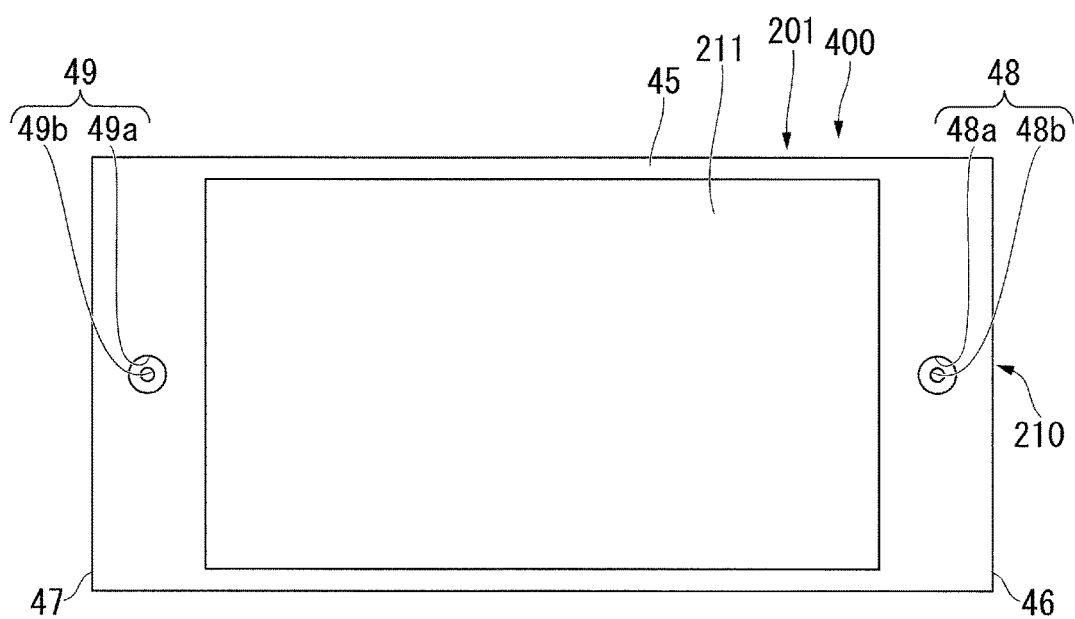
FIG. 12 is a plan view of a secondary battery related to another configuration of the embodiments.

In the above described embodiments, a description has been provided of a secondary battery in which a shape in a plan view is a circular shape, but it is possible to employ various shapes without limitation to the configuration. In this case, for example, it is possible to employ a rectangular shape in a plan view similar to a secondary battery 400 as shown in FIG. 12.

In the above-described embodiments, a description has been given of a case where the notched portions 48 and 49, into which the fastening member 50 can be inserted, are respectively formed in the attachment portions 46 and 47, but this configuration can be appropriately changed as long as the base substrate can be fixed to the external substrate 80 with the fastening member. For example, the attachment portions 46 and 47 may be pinched between the head 50a of the fastening member 50 and the external substrate 80.

In the above-described embodiments, description has been given of a case of forming the attachment portions 46 and 47 which protrude from a part of the base substrate, but a portion, which is located on an outer side of the lid substrate, in the outer peripheral portion of the mounting portion 45 may be set as the attachment portion without limitation to the above-described configuration.

In the above-described embodiments, description has been given of a configuration in which both of the positive electrode connection wiring and the negative electrode connection wiring are mounted by using the fastening member 50, but at least one of the connection wirings may be mounted by using the fastening member without limitation to the above-described case. In this case, an elastically deformable electrode terminal, which is provided on the external substrate 80, may be brought into contact with the other connection wirings to realize electrical conduction between the electrode terminal and the other connection wiring.

According to this configuration, it is possible to further suppress an increase in size of an external shape of the exterior packaging body in a plan view in comparison to a configuration in which attachment portions for both of the positive electrode connection wiring and the negative electrode connection wiring are provided in the electrochemical cell itself. The electrode terminal can be formed by performing nickel plating or gold plating with respect to an elastic metal.

In the above-described embodiments, a description has been provided of a configuration in which the connection wirings are formed on the lower surface of the base substrate or at the inside of the base substrate, but the connection wirings may be formed on the upper surface of the base substrate without limitation thereto.

In the above-described embodiments, various substrates in electronic parts are applicable to the "external substrate". However, for example, in a movement of a timepiece, not only a printed substrate (PCB) configured to drive and control various electronic elements, but also a metallic portion (metallic substrate) that is connected to the printed substrate are included in the "external substrate". That is, the electrochemical cell can be mounted on the metallic portion in the movement of the timepiece by using the fastening member 50.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electrochemical cell comprising:
an electrode body in which a first electrode layer and a second electrode layer are alternately stacked in a first direction via a solid electrolyte;
an exterior packaging body in which a plurality of substrates including a first substrate of a ceramic material are stacked in the first direction, and defining a cavity that accommodates the electrode body;
a first electrode connection wiring in the exterior packaging body and connecting the first electrode layer and an external substrate to each other, the external substrate coextensive with the first substrate; and
a second electrode connection wiring in the exterior packaging body and connecting the second electrode layer and the external substrate to each other,
wherein at least the first electrode connection wiring is in the first substrate, and
an attachment portion configured to attach a first fastening member is at the first substrate,
at least the first electrode connection wiring and the first substrate are mounted to the external substrate by attaching the first fastening member to the attachment portion, and
the attachment portion protrudes so as to be separated from the electrode body in an in-plane direction of the first substrate, in a plan view seen from the first direction.

2. The electrochemical cell according to claim 1, wherein the first electrode connection wiring and the second electrode connection wiring are at the first substrate, and the attachment portion includes:
a first electrode attachment portion to which the first fastening member is attached; and
a second electrode attachment portion to which a second fastening member configured to mount the second electrode connection wiring to the external substrate is attached.

3. The electrochemical cell according to claim 1, wherein the first substrate includes a mounting portion on which the electrode body is mounted, and the attachment portion protrudes so as to be separated from the mounting portion in the in-plane direction of the first substrate, in a plan view seen from the first direction.

4. The electrochemical cell according to claim 1, wherein the attachment portion includes a notched portion into which the fastening member is inserted in the first direction.

5. The electrochemical cell according to claim 4, wherein at least the first electrode connection wiring is exposed to an inner surface of the notched portion.

6. The electrochemical cell according to claim 5, wherein the notched portion includes a head accommodating portion in which a head of the fastening member is accommodated, and a shaft accommodating portion into which a shaft portion of the fastening member is inserted, and which has a diameter smaller than a diameter of the head accommodating portion, and
wherein the first electrode connection wiring is exposed to a surface faces the fastening member in the first direction.

7. The electrochemical cell according to claim 1, wherein the first electrode connection wiring is exposed to a surface of the first substrate that faces the external substrate.

8. The electrochemical cell according to claim 1, wherein the second electrode connection wiring is connected to an elastically deformable electrode terminal in the external substrate.

* * * * *